United States Patent

Simioni

[11] Patent Number: 5,987,702
[45] Date of Patent: Nov. 23, 1999

[54] CONNECTING DEVICE, PARTICULARLY FOR EYEGLASSES

[75] Inventor: Luciano Simioni, Montebelluna, Italy

[73] Assignee: Luxottica Leasing S.p.A., Agordo, Italy

[21] Appl. No.: 09/086,034

[22] Filed: May 28, 1998

[30] Foreign Application Priority Data

May 29, 1997 [IT] Italy .................. TV97A0070

[51] Int. Cl.⁶ .................................................. G02C 5/22
[52] U.S. Cl. ........................... 16/228; 351/113; 403/325; 403/327; 16/261
[58] Field of Search ............................ 16/228, 254, 257, 16/261, 271; 403/326, 327, 325; 351/111, 113, 114, 116, 119, 121, 153

[56] References Cited

U.S. PATENT DOCUMENTS

| | | | |
|---|---|---|---|
| 3,052,161 | 9/1962 | Berend | 88/52 |
| 3,899,840 | 8/1975 | Maillet | 351/113 |
| 4,354,744 | 10/1982 | Bononi | 351/153 |
| 4,570,289 | 2/1986 | Consolati | 16/228 |
| 4,747,183 | 5/1988 | Drlik | 16/228 |
| 4,974,289 | 12/1990 | Piard | 16/228 |
| 4,991,258 | 2/1991 | Drlik | 16/228 |
| 5,025,530 | 6/1991 | Ferrari et al. | 16/236 |
| 5,035,498 | 7/1991 | Bolle | 351/116 |
| 5,059,017 | 10/1991 | Bennato | 351/121 |
| 5,386,254 | 1/1995 | Kahaney | 351/60 |
| 5,387,949 | 2/1995 | Tackles | 351/121 |
| 5,400,090 | 3/1995 | Chen | 351/113 |
| 5,483,302 | 1/1996 | Jaffelin | 351/113 |
| 5,533,233 | 7/1996 | Wagner et al. | 16/228 |
| 5,627,608 | 5/1997 | Chao | 351/113 |
| 5,661,536 | 8/1997 | Conway | 351/121 |
| 5,666,181 | 9/1997 | Conway | 351/113 |
| 5,668,619 | 9/1997 | Bolle | 351/116 |
| 5,671,036 | 9/1997 | Huang | 351/113 |
| 5,673,095 | 9/1997 | Conway | 351/113 |
| 5,708,489 | 1/1998 | Jannard | 351/41 |
| 5,739,891 | 4/1998 | Wei | 351/113 |
| 5,760,869 | 6/1998 | Mitamura | 16/228 |
| 5,793,464 | 8/1998 | Chen | 351/116 |
| 5,818,567 | 10/1998 | Sakai | 351/113 |

FOREIGN PATENT DOCUMENTS

| | | | |
|---|---|---|---|
| 0 749 028 A1 | 12/1986 | European Pat. Off. | |
| 2 654 846 | 5/1991 | France | |
| 4132900 | 4/1993 | Germany | 16/228 |
| 96 13236 | 5/1996 | WIPO | |

OTHER PUBLICATIONS

French Design Registration Number 98 2863 Publication 517 678 to 517 680 Date of Publication Oct. 16, 1998.

Primary Examiner—Chuck Y. Mah
Attorney, Agent, or Firm—Katherine McGuire

[57] ABSTRACT

A connecting device, particularly for mutually connecting components of eyeglasses such as temples and a front and/or a lens and a lens and/or an eyewire and an eyewire and/or a temple and a temple. The device is constituted by at least one element which is detachably associable, with an interlocking action, with at least one of the components, in contrast with at least one flexible element, and can be pivoted to the other component. The device is structurally simple, easy and straightforward to assemble, and at the same time allows to achieve, for example, the extrawide opening of the temple at a low cost and without seizing.

15 Claims, 4 Drawing Sheets

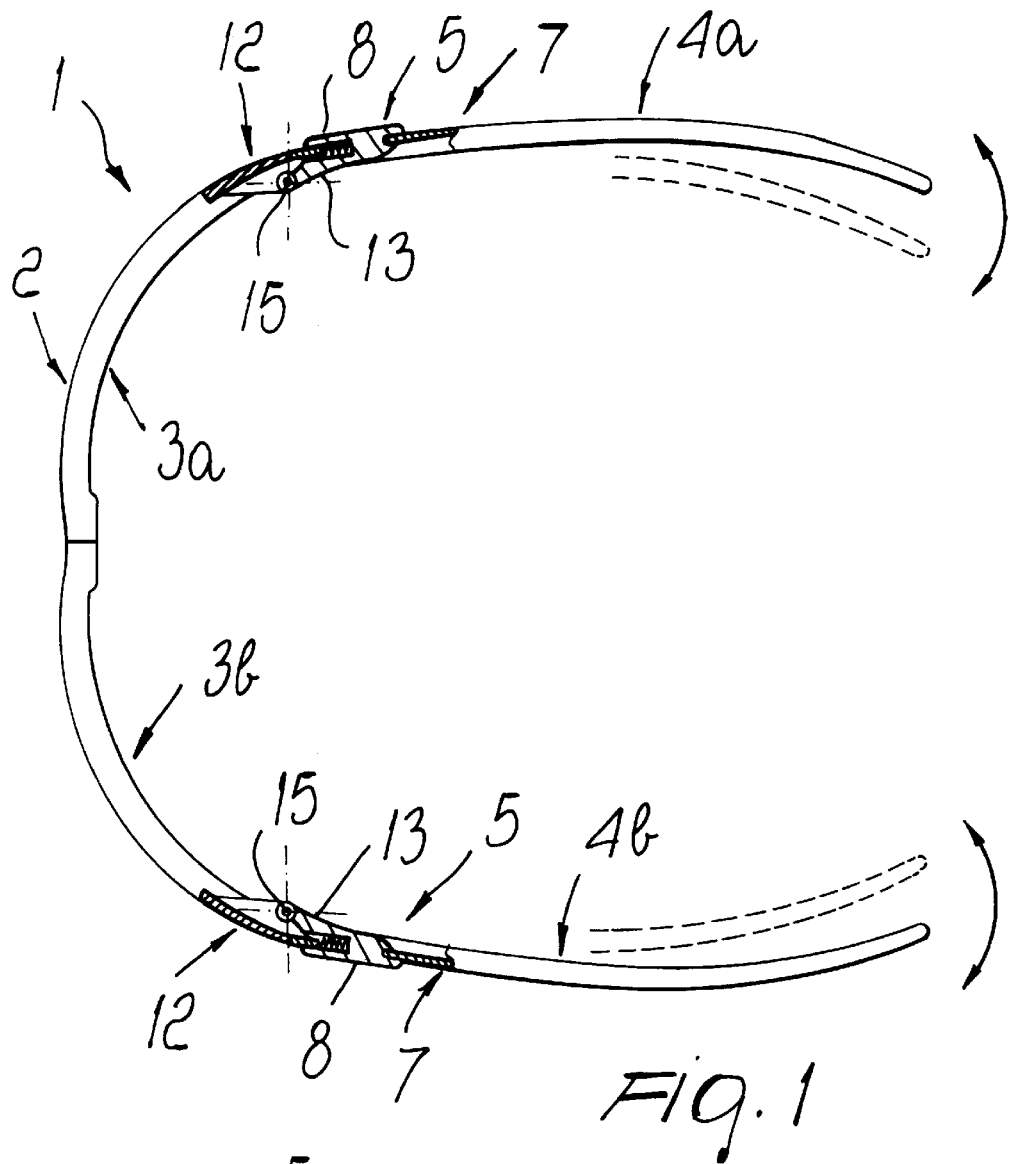
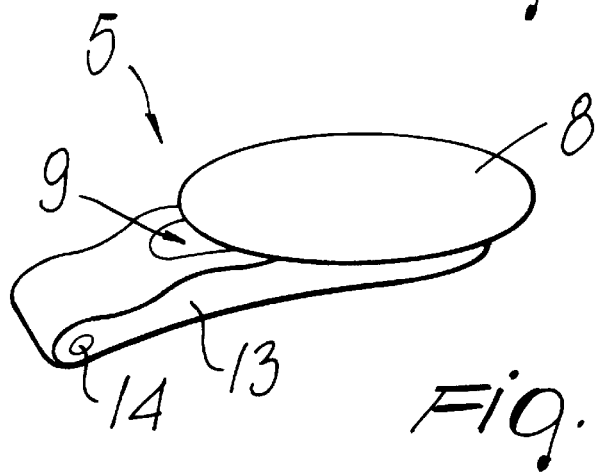

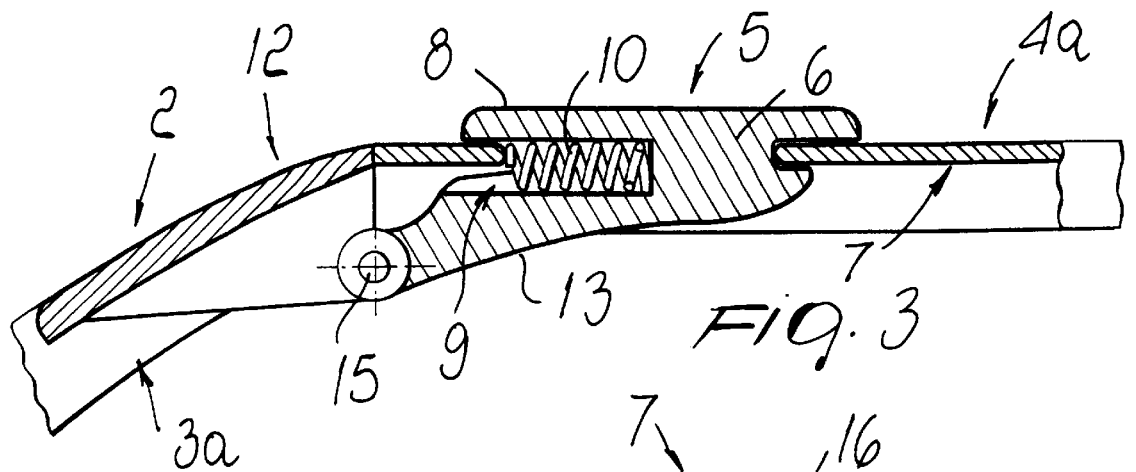
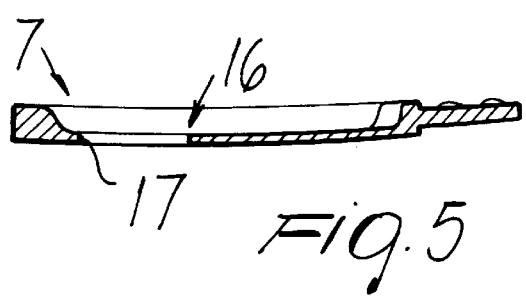
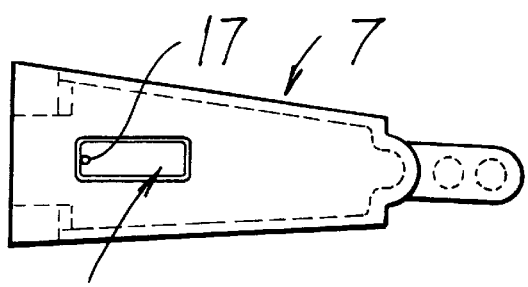
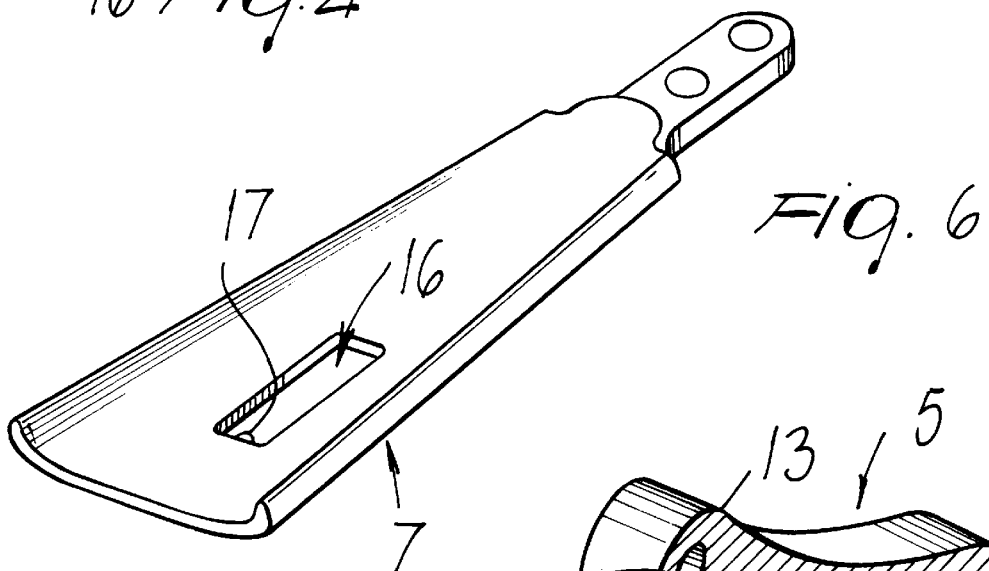
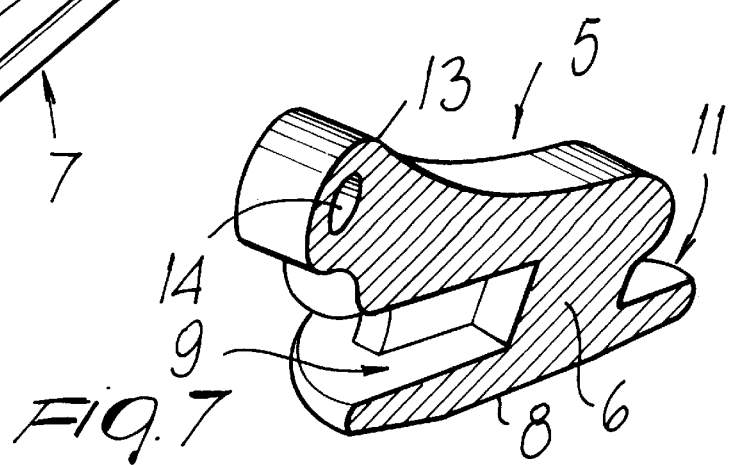

5,987,702

1

CONNECTING DEVICE, PARTICULARLY FOR EYEGLASSES

BACKGROUND OF THE INVENTION

The present invention relates to a connecting device particularly for eyeglasses.

Said eyeglasses can be constituted by a front, formed for example monolithically, which forms two eyewires which accommodate lenses and are connected by means of a bridge, said front is associated, at its ends, with hinges which are in turn connected to temples.

As an alternative, eyeglasses are known which are constituted by a front formed by an arched element provided with a single longitudinal seat for the snap insertion of the upper perimetric edge of a single lens or of a pair of lenses if an intermediate bridge for connecting the eyewires is still present.

As regards the hinges, they are usually constituted by two mutually rotatably associated elements whose free ends are associated by pressing or are embedded for example in the temple and in the front.

As an alternative, said two elements are formed or obtained directly at the ends of said temples and said front.

Eyeglasses are also known which have metallic components and in which it is known to perform welds, by applying heat or ultrasound, in order to mutually connect the two elements that constitute the hinge.

If the eyeglasses are made of plastics, it is known to mutually glue the components and it is also known to obtain the hinges from the mold.

Finally, it is also known to mutually connect two components of the hinge by riveting them.

However, manufacturing these conventional eyeglasses entails high production costs due to the processes required, to the particular machines and to the special molds meant to manufacture them.

Another problem that is felt is the provision of, for example, the extrawide opening of the temple and therefore the possibility to arrange said temple temporarily at an angle of more than 90° with respect to the front, so as to adapt to the shape of the temples of the user or allow to put the eyeglasses on optimally.

Italian patent application no. PD93A000244 of Dec. 17, 1993, is known as a partial solution to these drawbacks, which discloses an elastic hinge for eyeglasses of the type which comprises, at the end of a temple, an elongated hollow body with a flat end, said body containing an elastic means which is arranged between the head of a pivot which passes axially through it and a contrast element which is locked in said body, said pivot passing through said contrast element and engaging a first hinge element to which a second hinge element is pivoted which is fixed to the front of the eyeglasses and has a polygonal profile, one side of which rests on the flat end of said hollow body, said hinge being characterized in that said contrast element comprises two diametrically mutually opposite flexible axial tabs, respective external raised portions of which are accommodated in suitable seats of said hollow body in a non-deformed configuration with them after insertion in said hollow body.

This solution, however, has some drawbacks, including structural complexity, a large number of components, the need to assemble said components, and ultimately high manufacturing costs.

Italian patent application no. UD94A000124 of Jul. 14, 1994 is also known which discloses an elastic hinge for

2 connecting an earpiece and a front of eyeglasses; said hinge is essentially constituted by a support and a cover between which a temple and an insert are radially pivoted by means of suitable screws; said insert is then welded to the front.

Coaxially to one of said screws, arranged at right angles to the longitudinal axis of the insert and of the temple, there is a spring, one end of which cooperates with a pusher tooth which protrudes axially with respect to the temple.

This solution, too, has the above mentioned drawbacks.

Italian patent application no. UD93A000251 of Dec. 17, 1993 is also known which discloses a hinge for connecting the earpieces and frames which has pivot means for connection to cam means and in which the earpiece has at least elastic contrast means of the cylinder type as well as seat means.

In said hinge, the characteristic consists of the fact that the cylinder-type elastic contrast means have, in an upward region, an inclined flat profile with a lateral extension shaped like a retention tooth and that the cam means associated with the frames have two inclined-plane faces which are angled with respect to each other and to the plane that contains the longitudinal sliding axis of said cylinder.

This solution, too, has the above mentioned drawbacks, with the addition that the interaction of the cam with the inclined surface entails friction and sliding problems which can cause seizing.

SUMMARY OF THE INVENTION

The aim of the present application is therefore to solve the mentioned technical problems, eliminating the drawbacks of the cited prior art by providing a device which allows to achieve quick and easy connection among the various components of eyeglasses.

Within the scope of the above aim, an important object is to provide a device which is structurally very simple.

Another important object is to provide a device which does not have friction and/or sliding problems and is thus free from any seizing.

Another important object is to provide a device which has a low number of components which can be mutually assembled quickly, easily and stably.

Another important object is to provide a device which associates with the preceding characteristics that of being producible with conventional and known machines and equipment at low facturing costs.

Another object is to provide a device which is reliable and safe in use and allows slight mutual deformations of the mutually connected components.

This aim, these objects and others which will become apparent hereinafter are achieved by a connecting device, particularly for mutually connecting components of eyeglasses such as temples and a front and/or a lens and a lens and/or an eyewire and an eyewire and/or a temple and a temple, characterized in that it is constituted by at least one element which is detachably associable with an interlocking action, in contrast with at least one flexible element, with at least one of said components and can be pivoted to at least one of said components.

BRIEF DESCRIPTION OF THE DRAWINGS

Further characteristics and advantages of the invention will become apparent from the detailed description of some particular but not exclusive embodiments, illustrated only by way of non-limitative example in the accompanying drawings, wherein:

FIG. 1 is a partially sectional, plan view of a pair of eyeglasses in accordance with the present invention;

FIG. 2 is a lateral perspective view of the connecting device;

FIG. 3 is a longitudinal median sectional view of the connecting device for mutually connecting a temple and the front;

FIGS. 4, 5 and 6 are views of the end of a temple, which is shown respectively in a plan view of the inner side, in a sectional view taken along the median longitudinal plane, and in a lateral perspective view;

FIG. 7 is a sectional lateral perspective view of the device, taken along a longitudinal median plane;

DETAILED DESCRIPTIOIN

Figure 8:
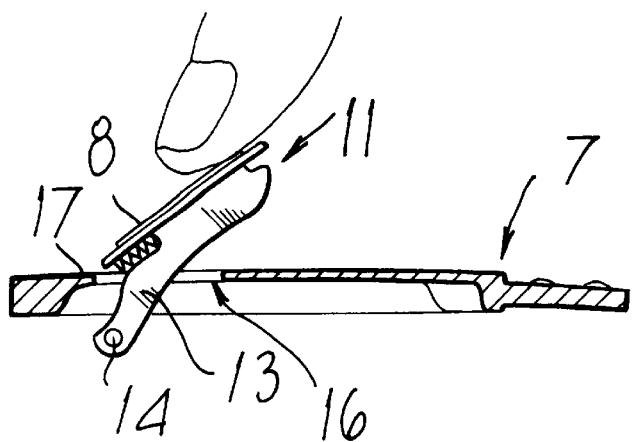
FIGS. 8, 9 and 10 illustrate the method for the interlocking application of the connecting device to the temple.

With reference to the above figures, the reference numeral 1 designates eyeglasses composed of a front 2, optionally divided into two separate eyewires 3a and 3b, and of a pair of temples 4a, 4b.

The reference numeral 5 generally designates the connecting device, which is constituted by at least one element, such as a body 6 made of plastics, which is detachably associable, with an interlocking action, at a first end 7 of the temples 4a, 4b.

Said body 6 has a flat surface 8 below which there is a first axial cavity 9 which partially affects the longitudinal extension of said body.

At least one flexible element, such as a cylindrical helical compression spring 10 or other technically equivalent element, can be accommodated within said first axial cavity 9.

The body 6 has, on the opposite side with respect to the first axial cavity 9 and preferably along the same axis, a second axial cavity 11.

On the opposite side with respect to the flat surface 8, the body 6 has, at the first axial cavity 9, a tab 13 which protrudes therefrom in the opposite direction with respect to the second axial cavity 11.

The tab 13 has, at one end, a first transverse hole 14 which accommodates a pivot 15 for the pivoting or hinging of said body at the second end 12 of the front 2.

The connecting device 5 can be inserted with a snap action at a suitable seat or opening 16 formed longitudinally to the first end 7 of the temples 4a, 4b; said seat or opening is substantially rectangular, with a shorter side whose dimensions slightly exceed the width of the tab 13 and with a longer side whose dimensions exceed the depth of the first and second axial cavities.

A tooth 17 protrudes axially to the seat or opening 16, proximate to the end that is adjacent to the front 2, and is suitable to partially engage the first axial cavity 9 in contrast with the spring 10.

Figure 9:
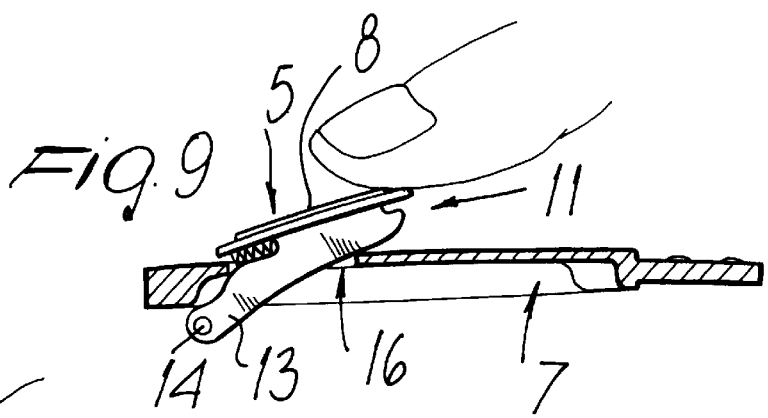
Figure 10:
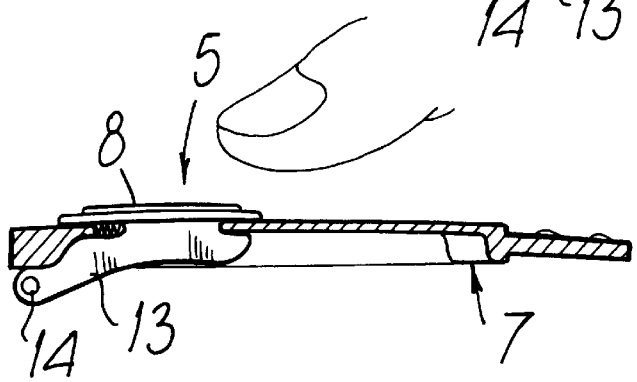

The connection method is shown in FIGS. 8, 9 and 10; the user first of all inserts the tab 13 at the seat or opening 16, placing the tooth 17 at the first axial cavity 9.

The user then forces with his finger the compression of the spring 10 until the second axial cavity 11 is arranged at the seat or opening 16 and, by virtue of the compression of the spring 10, is affected by the shorter side of said seat or opening 16.

Snap connection to the temple thus occurs and the tab 13 can then be hinged to the other component of the eyeglasses.

It has thus been found that the invention has achieved the intended aim and objects, a device having been provided which allows to achieve quick and easy mutual connection among the various components of the eyeglasses and is structurally simple and free from friction and sliding problems and thus free from any seizing.

The device can be assembled quickly and simply, since it is sufficient to insert a spring at the first axial cavity.

The device and the execution of the seat or opening 16 are furthermore very simple and this allows to contain the overall manufacturing costs of the eyeglasses.

The presence of the flexible element furthermore allows slight divarications of the temples in order to achieve, for example, extrawide opening thereof.

The device according to the invention is of course susceptible of numerous modifications and variations, all of which are within the scope of the same inventive concept.

Thus, for example, the part that is connected to the front can be provided in the chosen manner and therefore, for example, by means of locking screws, interlock systems, gluing or others.

Figure 11:
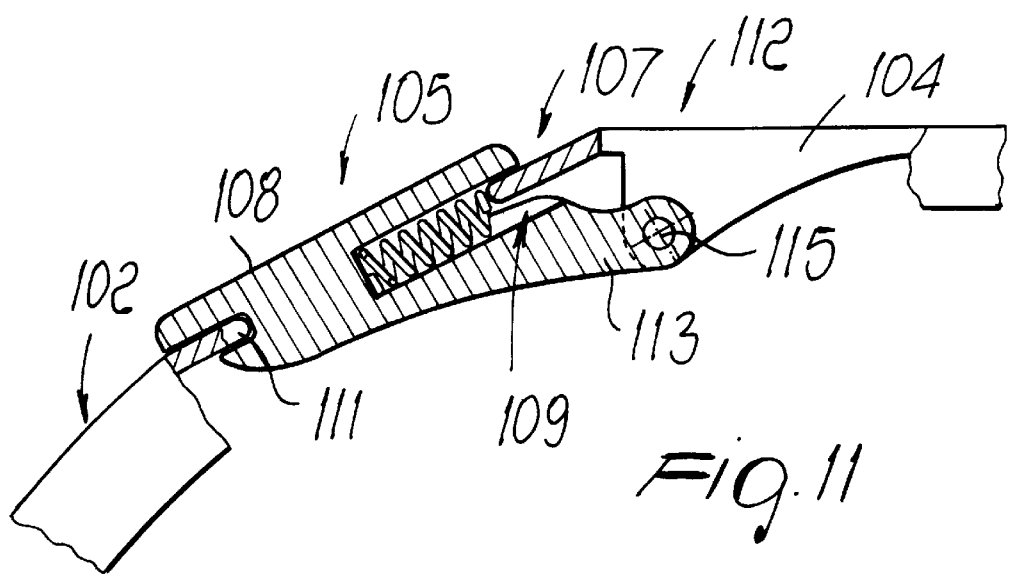
FIG. 11 is a view, similar to FIG. 3, of a different embodiment.

FIG. 11 illustrates another embodiment for a connecting device 105 which again has a flat surface 108 below which there are, along the same axis, a first axial cavity 109 and a second axial cavity 111; a tab 113 protrudes at the first axial cavity 109 and has, at its end, a first transverse hole which accommodates a pivot 115 for pivoting to a second end 112 of the temple 104.

The connecting device 105 is associable at a suitable seat or opening formed on the first end 107 of the front 102, in a manner similar to the one described above.

Figure 12:
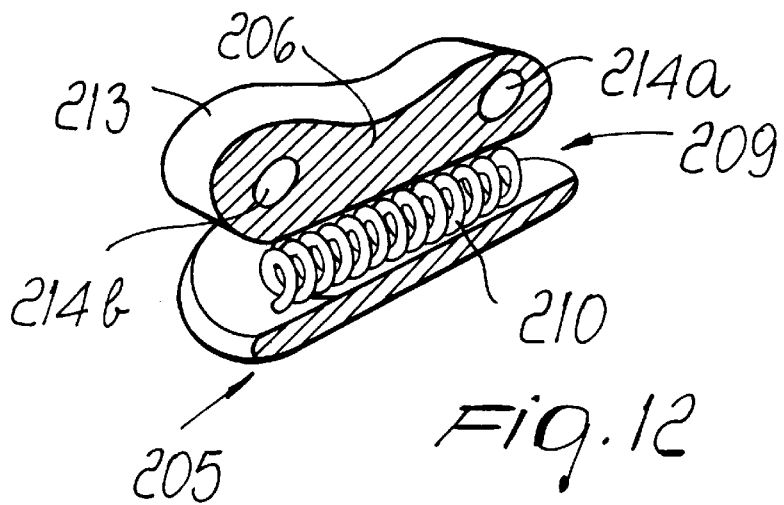
FIGS. 12 and 13 are views, similar to FIGS. 7 and 3 respectively, of another embodiment.
Figure 13:
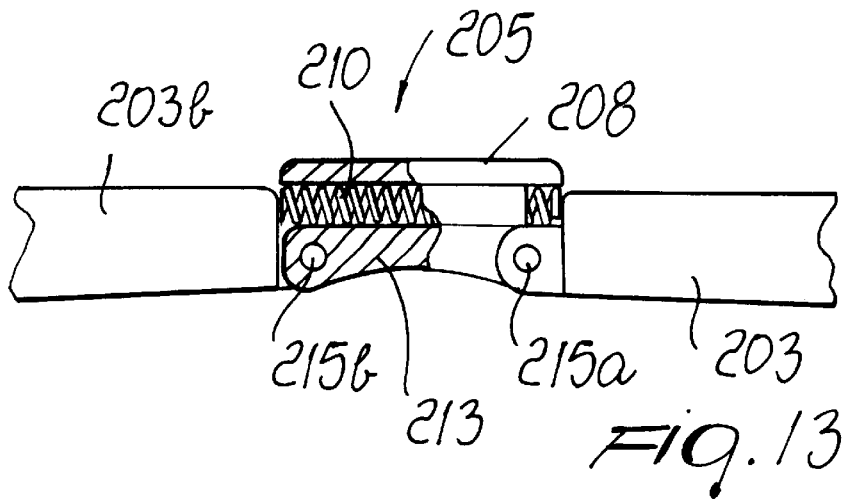

FIGS. 12 and 13 illustrate another embodiment of a connecting device 205, which is constituted by a body 206 having a single axial through cavity 209 which accommodates at least one flexible element such as a spring 210.

Said connecting device 205 has a flat surface 208 and, on the opposite side, a tab 213 which has, at its end, a pair of first transverse holes 214a and 214b which accommodate pivots 215a and 215b for pivoting to the ends of the eyewires 203a, 203b, preferably in the region above the user's nose.

Advantageously, the spring 210 has a greater extension, when inactive, than the axial through cavity 209, so as to allow a slight deformation of the eyewires thus allowing better adaptability to the shape of the user's face.

Figure 14:
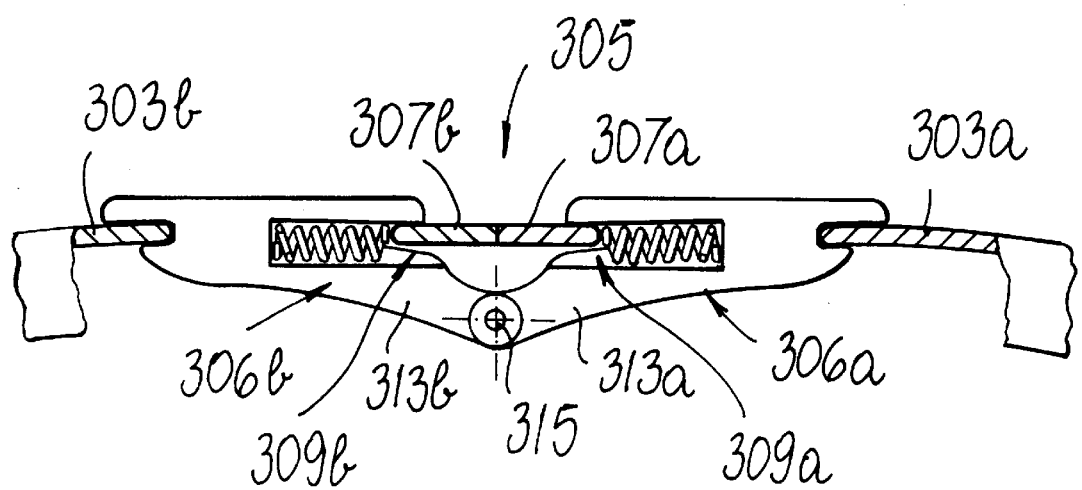
FIG. 14 is a view, similar to FIG. 3, of another embodiment.

FIG. 14 illustrates another embodiment of a connecting device 305, which is constituted by two bodies 306a and 306b which are mutually identical and mirror-symmetrical and have a tab 313a and 313b which is transversely perforated and can be mutually hinged by virtue of a pivot 315.

Advantageously, the bodies 306a and 306b, each of which has a first mutually facing axial cavity 309a and 309b, are associable at a suitable seat or opening formed at the opposite ends 307a and 307b of the eyewires 303a and 303b, advantageously at the region above the eyepiece of the eyeglasses.

In this manner, the eyeglasses can be of the folding type, so as to reduce bulk when stored.

Another solution in which the connecting device can be applied is in a median or non-median region of an individual temple, so as to achieve folding of said temple as well.

The materials may of course also be the most convenient according to the specific requirements; thus, for example, the flexible element can be constituted by an elastomer or another elastically compressible material.

What is claimed is:

1. A connecting device for connecting a first eyeglass element to a second eyeglass element, comprising:

a through opening provided in said first eyeglass element, said through opening extending entirely through said first eyeglass element between mutually opposite surfaces of said first eyeglass element;

a body element, said body element having a first cavity and a second cavity which are arranged mutually opposite substantially along an axis of said body element and which are mutually separated by a wall portion of said body element arranged on said axis, said wall portion having an extension along said axis with a dimension which is smaller than a dimension extending between two mutually opposite edge portions of said through opening such that said body element may be insertably arranged in said through opening so that said wall portion is arranged between said mutually opposite edge portions of said through opening on said axis and such that said mutually opposite edge portions of said through opening are arranged inside said first and second cavities of said body element;

at least one flexible element arrangeable in one of said first and second cavities between one of said edge portions of said through opening of said first eyeglass element and said wall portion of body element for biasing said body element into a stably connected arrangement in said through opening of said first eyeglass element; and a pivot element connected to said body element for pivotally connecting said body element arranged in said stably connected arrangement in said through opening of said first eyeglass element to said second eyeglass element.

2. The connecting device of claim 1, wherein when said body element is arranged in said stably connected arrangement in said through opening of said first eyeglass element, said body element has a first side engaged at a first surface of said mutually opposite surfaces of said first eyeglass element, and a second side engaged at a second surface of said mutually opposite surfaces of said first eyeglass element.

3. The connecting device of claim 2, wherein said pivot element is arranged adjacent one of said mutually opposite surfaces of said first eyeglass element.

4. The connecting device of claim 1, wherein said first eyeglass element is a temple and said second eyeglass element is a front.

5. The connecting device of claim 1, wherein said first eyeglass element is a front and said second eyeglass element is a temple.

6. A combination of a connecting device in a pair of eyeglasses which connects a first eyeglass element of said pair of eyeglasses to a second eyeglass element of said pair of eyeglasses, the combination comprising:

a through opening provided in said first eyeglass element, said through opening extending entirely through said first eyeglass element between mutually opposite surfaces of said first eyeglass element;

a body element, said body element having a first cavity and a second cavity which are arranged mutually opposite substantially along an axis of said body element and which are mutually separated by a wall portion of said body element arranged on said axis, said wall portion having an extension along said axis with a dimension which is smaller than a dimension extending between two mutually opposite edge portions of said through opening such that said body element is insertably arranged in said through opening so that said wall portion is arranged between said mutually opposite edge portions of said through opening on said axis and such that said mutually opposite edge portions of said through opening are arranged inside said first and second cavities of said body element;

at least one flexible element arranged in one of said first and second cavities between one of said edge portions of said through opening of said first eyeglass element and said wall portion of body element so as to bias said body element into a stably connected arrangement in said through opening of said first eyeglass element; and a pivot element connected to said body element for pivotally connecting said body element arranged in said stably connected arrangement in said through opening of said first eyeglass element to said second eyeglass element.

7. The combination of claim 6, wherein said body element has a first side engaged at a first Surface of said mutually opposite surfaces of said first eyeglass element, and a second side engaged at a second surface of said mutually opposite surfaces of said first eyeglass element.

8. The combination of claim 7, wherein said pivot element is arranged adjacent one of said mutually opposite surfaces of said first eyeglass element.

9. The combination of claim 6, wherein said first eyeglass element is a temple and said second eyeglass element is a front.

10. The combination of claim 6, wherein said first eyeglass element is a front and said second eyeglass element is a temple.

11. A method of connecting a first eyeglass element of a pair of eyeglasses to a second eyeglass element of said pair of eyeglasses, comprising:

providing a through opening in said first eyeglass element such that said through opening extends entirely through said first eyeglass element between mutually opposite surfaces of said first eyeglass element;

providing a body element such that said body element has a first cavity and a second cavity which are arranged mutually opposite substantially along an axis of said body element and which are mutually separated by a wall portion of said body element arranged on said axis, and such that said wall portion has an extension along said axis with a dimension which is smaller than a dimension extending between two mutually opposite edge portions of said through opening;

providing at least one flexible element;

insertably arranging said body element in said through opening such that said wall portion is arranged between said mutually opposite edge portions of said through opening on said axis, and such that said mutually opposite edge portions of said through opening are arranged inside said first and second cavities of said body element, and such that said at least one flexible element is arranged in one of said first and second cavities between one of said edge portions of said through opening of said first eyeglass element and said wall portion of body element so as to bias said body element into a stably connected arrangement in said through opening of said first eyeglass element; and pivotally connecting said body element arranged in said stably connected arrangement in said through opening of said first eyeglass element to said second eyeglass element.

12. The method of claim 11, further comprising engaging a first side of said body element at a first surface of said mutually opposite surfaces of said first eyeglass element, and engaging a second side of said body element at a second surface of said mutually opposite surfaces of said first eyeglass element.

13. The method of claim 12, further comprising arranging a pivot element, for pivotally connecting said body element arranged in said stably connected arrangement in said through opening of said first eyeglass element to said second eyeglass element, adjacent one of said mutually opposite surfaces of said first eyeglass element.

14. The method of claim 11, comprising providing said first eyeglass element as a temple and providing said second eyeglass element as a front.

15. The method of claim 11, comprising providing said first eyeglass element as a front and providing said second eyeglass element as a temple.

* * * * *